United States Patent
Miyashita et al.

(10) Patent No.: US 12,060,446 B2
(45) Date of Patent: Aug. 13, 2024

(54) RESIN COMPOSITION, METHOD FOR PRODUCING RESIN COMPOSITION, MOLDED ARTICLE, AND METHOD FOR PRODUCING MOLDED ARTICLE

(71) Applicant: Kureha Corporation, Tokyo (JP)

(72) Inventors: Tatsuaki Miyashita, Tokyo (JP); Kazuyuki Suzuki, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 374 days.

(21) Appl. No.: 17/309,862

(22) PCT Filed: Oct. 18, 2019

(86) PCT No.: PCT/JP2019/041182
§ 371 (c)(1),
(2) Date: Jun. 24, 2021

(87) PCT Pub. No.: WO2020/137116
PCT Pub. Date: Jul. 2, 2020

(65) Prior Publication Data
US 2022/0073665 A1    Mar. 10, 2022

(30) Foreign Application Priority Data

Dec. 27, 2018  (JP) ................ 2018-245941

(51) Int. Cl.
*C08F 214/28* (2006.01)
*C08F 114/22* (2006.01)
*C08K 5/41* (2006.01)

(52) U.S. Cl.
CPC .......... *C08F 214/28* (2013.01); *C08F 114/22* (2013.01); *C08K 5/41* (2013.01)

(58) Field of Classification Search
CPC ......... C08F 214/28; C08F 114/22; C08K 5/41
USPC ...................................................... 428/220
See application file for complete search history.

(56) References Cited

U.S. PATENT DOCUMENTS

| | | | |
|---|---|---|---|
| 3,701,749 | A | 10/1972 | Segawa et al. |
| 4,456,638 | A | 6/1984 | Petcavich |
| 6,610,766 | B1 | 8/2003 | Kitamura et al. |
| 9,493,595 | B2 | 11/2016 | Durali et al. |
| 2008/0281031 | A1 | 11/2008 | Judovits et al. |
| 2011/0111156 | A1 | 5/2011 | Durali et al. |
| 2014/0342162 | A1 | 11/2014 | Sanefuji et al. |
| 2016/0215120 | A1 | 7/2016 | Henry |
| 2017/0096553 | A1 | 4/2017 | Ikawa et al. |
| 2018/0127532 | A1 | 5/2018 | Ikawa et al. |
| 2018/0244019 | A1 | 8/2018 | Higashikawa et al. |
| 2022/0073665 | A1 | 3/2022 | Miyashita et al. |

FOREIGN PATENT DOCUMENTS

| | | |
|---|---|---|
| CN | 103930275 A | 7/2014 |
| CN | 105683223 A | 6/2016 |
| CN | 108025540 A | 5/2018 |
| CN | 109843585 A | 6/2019 |
| EP | 942038 A1 | 9/1999 |
| EP | 2756950 A1 | 7/2014 |
| EP | 3052533 A1 | 8/2016 |
| EP | 3348395 A1 | 7/2018 |
| JP | 48-33983 B1 | 10/1973 |
| JP | 60-103327 A | 6/1985 |
| JP | 6-80794 A | 3/1994 |
| JP | 6-91735 A | 4/1994 |
| JP | 10-193483 A | 7/1998 |
| JP | 11-323052 A | 11/1999 |
| JP | 2005-350621 A | 12/2005 |
| JP | 2005350621 A * | 12/2005 |
| JP | 2013-64068 A | 4/2013 |
| JP | 2015-63621 A | 4/2015 |
| JP | 2015063621 A * | 4/2015 |
| JP | 2016-125029 A | 7/2016 |
| JP | 2016-531964 A | 10/2016 |
| JP | 2017-29934 A | 2/2017 |
| JP | 2017-95683 A | 6/2017 |
| JP | 2017-155087 A | 9/2017 |
| JP | 2017-206671 A | 11/2017 |
| JP | 2018-62111 A | 4/2018 |
| KR | 10-2014-0060355 A | 5/2014 |
| KR | 10-2018-0032609 A | 3/2018 |
| KR | 10-2019-0052712 A | 5/2019 |
| TW | 201827228 A | 8/2018 |
| WO | WO 2010/005755 A1 | 12/2010 |
| WO | 2013/039119 A1 | 3/2013 |
| WO | 2015/048697 A1 | 4/2015 |

(Continued)

OTHER PUBLICATIONS

Machine_English_translation_JP_2015063621_A; Saeki, et al.; Fluororesin Composition and Film; Apr. 9, 2015; EPO; whole document (Year: 2023).*
Machine_English_translation_JP_2005350621_A; Ito, et al.; Semiconductive Polyvinylidene Fluoride Resin Composition, Semiconductive Resin Molded Product and Process for Production of the Molded Product; Dec. 22, 2005; EPO; whole document (Year: 2023).*
Office Action issued Apr. 19, 2022, in Japanese Patent Application No. 2018-245941.
Database WPI, Week 200606, Thomson Scientific, London, GB; An 2006-050647, XP002805490.
Extended European Search Report issued Feb. 14, 2022, in European Patent Application No. 19905590.6.
Office Action issued Jan. 20, 2023, in Chinese Patent Application No. 201980082299.0.
Restriction Requirement issued Aug. 31, 2022, in U.S. Appl. No. 16/769,315.

(Continued)

*Primary Examiner* — Tahseen Khan
(74) *Attorney, Agent, or Firm* — Birch, Stewart, Kolasch & Birch, LLP

(57) ABSTRACT

Provided is a resin composition that can suppress yellowing even when used in a transparent molded article having a large thickness. The resin composition according to the present invention contains a vinylidene fluoride polymer as a main component, and further contains an alkyl quaternary ammonium sulfate. A percentage of irregular sequences in the vinylidene fluoride polymer is 4% or greater.

10 Claims, No Drawings

(56) References Cited

FOREIGN PATENT DOCUMENTS

| WO | WO 2015/098338 A1 | 7/2015 |
|---|---|---|
| WO | WO 2016/190276 A1 | 12/2016 |
| WO | 2017/43467 A1 | 3/2017 |
| WO | 2018/070313 A1 | 4/2018 |

OTHER PUBLICATIONS

English translation of International Preliminary Report on Patentability and Written Opinion issued Jul. 8, 2021, in PCT/JP2019/041182.
Office Action issued Jun. 29, 2022, in Chinese Patent Application No. 201980082299.0.
Decision on Rejection issued Nov. 21, 2022, in Chinese Patent Application No. 201880075026.9 with English translation.
International Preliminary Report on Patentability and Written Opinion mailed Jun. 18, 2020 in PCT/JP2018/031924 (Forms PCT/IB/338, PCT/IB/373, and PCT/ISA/327.
International Search Report for the International Application No. PCT/JP2018/031924, dated Oct. 30, 2018, with English translation.
Japanese Office Action for Japanese Application No. 2017-236519, dated Jan. 5, 2022, with English translation.
Office Action issued Apr. 7, 2022, in Chinese Patent Application No. 201880075026.9, with English translation.
Office Action issued Aug. 19, 2022, in Chinese Patent Application No. 201880075026.9, with English translation.
Office Action issued Jul. 13, 2021, in Japanese Patent Application No. 2017-236519, with English translation.
U.S. Office Action for U.S. Appl. No. 16/769,315, dated Dec. 2, 2022.
Office Action issued Aug. 30, 2022, in Japanese Patent Application No. 2018-245941.
Final Office Action issued Mar. 20, 2023, in U.S. Appl. No. 16/769,315.

* cited by examiner

RESIN COMPOSITION, METHOD FOR PRODUCING RESIN COMPOSITION, MOLDED ARTICLE, AND METHOD FOR PRODUCING MOLDED ARTICLE

TECHNICAL FIELD

The present invention relates to a resin composition, a method of producing a resin composition, a molded article, and a method of producing a molded article, and particularly relates to a resin composition containing a vinylidene fluoride polymer, a method of producing the same, as well as a molded article of the resin composition containing a vinylidene fluoride polymer and a method of producing the same.

BACKGROUND ART

Vinylidene fluoride resins exhibit high strength, chemical resistance, heat resistance, and a ferroelectric property, and thus are used in various fields. Patent Document 1 discloses a polyvinylidene fluoride resin composition that contains an alkyl quaternary ammonium sulfate or an alkyl quaternary ammonium sulfite in a polyvinylidene fluoride resin, and also indicates that the polyvinylidene fluoride resin composition excels in transparency. Due to such excellent transparency, fields of use of vinylidene fluoride resins such as application in optical members is further expanded.

CITATION LIST

Patent Document

Patent Document 1: JP 11-323052 A

SUMMARY OF INVENTION

Technical Problem

However, it was found that the thermal stability of the vinylidene fluoride resin composition containing an alkyl quaternary ammonium sulfate in a polyvinylidene fluoride resin is poor, and that the resin composition may yellow depending on the heating temperature during molding. To avoid this problem, use of such vinylidene fluoride resin composition must be limited to use in a thin molded article in which yellowing is not noticeable. Therefore, even though such vinylidene fluoride resin compositions exhibit transparency, a problem exists in that applications of such compositions as a transparent material are limited to a very narrow range.

Thus, the present invention was completed in light of the problems described above, and an object of the present invention is to provide a resin composition that can suppress yellowing in a molded article.

Solution to Problem

In order to solve the problems described above, a resin composition according to the present invention contains a vinylidene fluoride polymer as a main component, and further contains an alkyl quaternary ammonium sulfate, and a percentage of irregular sequences in the vinylidene fluoride polymer is 4% or greater.

Furthermore, in order to solve the problems described above, a method of producing the resin composition according to the present invention is a method of producing a resin composition that contains a vinylidene fluoride polymer as a main component, the method including adding an alkyl quaternary ammonium sulfate to a vinylidene fluoride polymer having a percentage of irregular sequences of 4% or greater.

A molded article according to the present invention is a molded article of a resin composition containing a vinylidene fluoride polymer as a main component, and has a yellowness index (YI) value of 40 or less, a haze of 40% or less, and a thickness of 1 mm or greater.

Advantageous Effects of Invention

According to the resin composition of the present invention, yellowing of a molded article can be suppressed.

DESCRIPTION OF EMBODIMENTS

An embodiment of a resin composition according to the present invention is described hereinafter.

The resin composition according to the present embodiment contains a vinylidene fluoride polymer as a main component, and further contains an alkyl quaternary ammonium sulfate.

Vinylidene Fluoride Polymer (Composition)

The vinylidene fluoride polymer according to the present embodiment is a polymer containing vinylidene fluoride as a main constituent component. "Containing vinylidene fluoride as a main constituent component" indicates that the vinylidene fluoride polymer contains 50 mol % or greater of structural units derived from vinylidene fluoride. The vinylidene fluoride polymer may be a homopolymer of vinylidene fluoride containing substantially 100 mass % of structural units derived from vinylidene fluoride, or may be a copolymer of vinylidene fluoride further containing structural units derived from other monomers that can copolymerize with vinylidene fluoride. Examples of other monomers that can copolymerize with vinylidene fluoride include tetrafluoroethylene, trifluoroethylene, chlorotrifluoroethylene, hexafluoropropylene, vinyl fluoride, 2,3,3,3-tetrafluoropropene, pentafluoropropene, perfluoromethyl vinyl ether, and perfluoropropyl vinyl ether. One type of other monomer may be used, or two or more types may be used. The content of the structural units derived from the other monomers is preferably not greater than 10 mol %, more preferably not greater than 5 mol %, and even more preferably not greater than 2 mol %, of the total of all structural units. A single type of vinylidene fluoride polymer can be used alone, or two or more types thereof can be used in combination.

Among vinylidene fluoride polymers, a homopolymer of vinylidene fluoride is preferable from the perspective of contamination resistance, ozone resistance, and solvent resistance. On the other hand, from the perspective of flexibility and tear strength, a vinylidene fluoride copolymer alone or a blend of a vinylidene fluoride copolymer and a vinylidene fluoride homopolymer is preferable. From the perspective of flexibility, the vinylidene fluoride copolymer is preferably a vinylidene fluoride-hexafluoropropylene copolymer.

(Irregular Sequence)

The percentage of irregular sequences contained in the vinylidene fluoride polymer of the present embodiment is 4% or greater. Here, an irregular sequence refers to a head-to-head bond and a tail-to-tail bond in a polymer to be head-to-tail bonded. For example, in a vinylidene fluoride polymer, "$CF_2$" and "$CH_2$" are typically bonded in an alternating manner, but there may be portions in which "$CF_2$" and "$CF_2$" are bonded, or portions in which "$CH_2$" and "$CH_2$" are bonded together. A portion at which "$CF_2$" is bonded to another "$CF_2$" or "$CH_2$" is bonded to another "$CH_2$" is an irregular sequence.

In relation to the total number of bonds, the percentage of irregular sequences in the vinylidene fluoride polymer need only be 4% or greater, and is more preferably not less than 4.3%, and even more preferably not less than 4.5%. The upper limit is not particularly limited, but in relation to the total number of bonds, is preferably less than 6%, more preferably less than 5.5%, and even more preferably less than 5%. The percentage of irregular sequences in the vinylidene fluoride polymer can be adjusted by the polymerization temperature in the production of the polymer. In addition, a commercially available polymer in which the percentage of irregular sequences is within the range described above may be used.

The percentage of irregular sequences can be determined from a $^{19}$F-NMR measurement of the vinylidene fluoride polymer. More specifically, 40 mg of the vinylidene fluoride polymer is dissolved in 0.8 ml of deuterated dimethylformamide (D7-DMF) and $^{19}$F-NMR measurements are implemented at room temperature. The resulting $^{19}$F-NMR spectrum has five major peaks at positions of −91.6 ppm, −92.1 ppm, −94.7 ppm, −113.5 ppm, and −115.9 ppm. Of these peaks, the peaks at −113.5 ppm and −115.9 ppm are identified as peaks derived from irregular sequences. Accordingly, the percentage of irregular sequences is calculated from the following equation (1) with the total of the surface areas of each of the five peaks being denoted by S0, the surface area of the peak at −113.5 ppm being denoted by S1, and the surface area of the peak at −115.9 ppm being denoted by S2.

Irregular Sequence Percentage (%)=[{(S1+S2)/2}/S0]×100    (1)

When the percentage of irregular sequences is within the range described above, for a case in which a resin composition containing an alkyl quaternary ammonium sulfate according to the present embodiment is used, yellowing of an obtained molded article can be suppressed even when the structure of the molded article has a thickness of 1 mm or greater, and the resin composition is molded at 190° C. or higher. Note that in the present specification, "yellowing is suppressed" means that the yellowness index (YI) value is not greater than 40. The YI value will be described below.

In a speculated mechanism of yellowing, the alkyl quaternary ammonium sulfate decomposes when heated and produces an amine. The resulting amine attacks a modified terminal of the vinylidene fluoride polymer, and thereby an HF-removal reaction proceeds. Once the HF-removal reaction occurs and a C=C bond is formed in the main chain, an HF-removal reaction is more likely to occur at a $CH_2$—$CF_2$ adjacent to the C=C bond, and the HF-removal reaction propagates along the main chain skeleton in a chain-like manner. It is thought that as a result, a long chain polyene structure is generated, and yellowing occurs. It is also thought that the presence of irregular sequences in the vinylidene fluoride polymer serves as a stopper for the HF-removal chain reaction, and as a result, a long chain polyene is less likely to be produced, and therefore yellowing can be suppressed. However, with the resin composition according to the present embodiment, the percentage of irregular sequences need only be equal to or greater than a predetermined value such that yellowing of the obtained molded article is suppressed, and the scope of the invention is not limited by this mechanism.

(Absorbance Ratio)

According to the speculated yellowing mechanism described above, the number of modified terminals among the terminals of the vinylidene fluoride polymer is preferably few. From this perspective, in the infrared absorption spectrum, the vinylidene fluoride polymer of the present embodiment preferably has an absorbance ratio ($A_R$), expressed by equation (2) below, of not greater than 0.09.

$$A_R = A_{1700-1800}/A_{3023} \qquad (2)$$

In equation (2), $A_{1700-1800}$ is the absorbance originating from the stretching vibration of carbonyl groups detected in a range from 1700 to 1800 $cm^{-1}$, and $A_{3023}$ is the absorbance originating from the stretching vibration of CH detected near 3023 $cm^{-1}$. Thus, the value of $A_R$ serves as a scale indicating the quantity of carbonyl groups present in the vinylidene fluoride polymer. When the monomer that constitutes the vinylidene fluoride polymer does not contain a carbonyl group, the value of $A_R$ serves as a scale indicating the quantity of ester terminals and carbonate terminals present therein. Note that when a monomer containing a carbonyl group such as acrylic acid is used as the monomer constituting the vinylidene fluoride polymer, the absorbance ratio ($A_R$) is a value reflecting the stretching vibration of the carbonyl group in the monomer. However, if the obtained absorbance ratio ($A_R$) is not greater than 0.09, an absorbance ratio ($A_R$) that reflects only the stretching vibration of the carbonyl groups at the ester terminal and carbonate terminal is inevitably a value smaller than 0.09.

As described above, from the perspective of suppressing yellowing, the value of the absorbance ratio ($A_R$) is preferably less than or equal to 0.09, more preferably less than or equal to 0.08, and even more preferably less than or equal to 0.06.

If the value of the absorbance ratio ($A_R$) is within the range described above, the degree of yellowing can be further reduced, and even if the resin composition is molded at a temperature higher than 190° C., for example a temperature of 250° C. or higher, yellowing of the obtained molded article can be suppressed.

The absorbance ratio is determined from the absorbance according to the infrared absorption spectrum using an infrared spectrophotometer. More specifically, first, the vinylidene fluoride polymer is hot-pressed at 230° C. to fabricate a pressed sheet with a thickness from 50 μm to 100 μm. Next, the infrared absorption spectrum of the pressed sheet is measured in a range from 1500 $cm^{-1}$ to 4000 $cm^{-1}$ using an infrared spectrophotometer (for example, the FT/IR-4100 (available from JASCO Corporation)). When a line connecting the absorbance at 1660 $cm^{-1}$ and the absorbance at 1900 $cm^{-1}$ is defined as a baseline, the maximum absorbance in a range from 1700 $cm^{-1}$ to 1800 $cm^{-1}$ is denoted by $A_{1700-1800}$. Meanwhile, the maximum absorbance at 3023±10 $cm^{-1}$ when a line connecting the absorbance at 2900 $cm^{-1}$ and the absorbance at 3300 $cm^{-1}$ is defined as a baseline, is denoted by $A_{3023}$.

(Other Physical Properties)

Regarding the viscosity of the vinylidene fluoride polymer of the present embodiment, from the viewpoint of processability, the inherent viscosity is preferably from 0.8 dL/g to 2.0 dL/g, more preferably from 0.8 dL/g to 1.3 dL/g, and even more preferably from 0.9 dL/g to 1.2 dL/g. The inherent viscosity can be determined as a logarithmic viscosity at 30° C. of a solution obtained by dissolving 4 g of the vinylidene fluoride polymer in 1 liter of N,N-dimethylformamide.

Furthermore, from the perspective of imparting sufficient mechanical strength, gas barrier properties, and solvent resistance to the molded article, the melting point of the vinylidene fluoride polymer in the present embodiment is preferably from 130 to 190° C., more preferably from 150 to 180° C., and even more preferably from 160 to 180° C. The melting point can be measured using differential scanning calorimetry.

(Method of Producing Vinylidene Fluoride Polymer)

Examples of methods for producing the vinylidene fluoride polymer include emulsion polymerization, soap-free emulsion polymerization, seed emulsion polymerization, suspension polymerization, mini-emulsion polymerization and solution polymerization. Among these, from the perspective of being able to reduce the absorbance ratio ($A_R$), emulsion polymerization, soap-free emulsion polymerization, and seed emulsion polymerization are preferable.

Emulsion polymerization is a type of radical polymerization. It is a polymerization method performed by mixing a medium such as water, a monomer hardly-soluble in the medium, and an emulsifier (hereinafter, also referred to as "surfactant"), and adding a polymerization initiator soluble in the medium. In emulsion polymerization, a dispersion medium, a surfactant, and a polymerization initiator are used in addition to vinylidene fluoride and other monomers.

Soap-free emulsion polymerization is an emulsion polymerization that is implemented without using an ordinary emulsifier like that used in the above-described emulsion polymerization.

Seed emulsion polymerization is polymerization that is implemented by coating microparticles obtained by the above-described emulsion polymerization or soap-free emulsion polymerization with a polymer formed from other monomers. Vinylidene fluoride and other monomers, a dispersion medium, a surfactant, and a polymerization initiator, etc. are further used in a dispersion of the microparticles.

Suspension polymerization is a polymerization method that is implemented by dissolving an oil-soluble polymerization initiator in a water-insoluble monomer in water containing an reagent such as a suspending agent, and then suspending and dispersing the materials through mechanical agitation. In suspension polymerization, polymerization progresses in monomer droplets, and thereby vinylidene fluoride polymer particles are obtained.

Mini-emulsion polymerization is a polymerization method that is implemented by reducing the size of monomer droplets to a sub-micron size by applying a strong shearing force using an apparatus such as an ultrasonic generator. In mini-emulsion polymerization, in order to stabilize the monomer droplets that have been reduced in size, a water-insoluble substance called a hydrophobe is added. In ideal mini-emulsion polymerization, microparticles of the vinylidene fluoride polymer are obtained by polymerizing monomer droplets.

<Alkyl Quaternary Ammonium Sulfate>

The alkyl quaternary ammonium sulfate of the present embodiment is a compound represented by the following formula (3).

[Chem. 1]

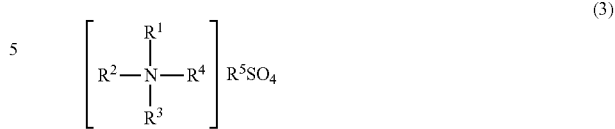

In formula (3), $R^1$ to $R^4$ denote alkyl groups having from 1 to 10 carbons and may be the same or different. Examples of the alkyl group include short-chain alkyl groups such as a methyl group, an ethyl group, a propyl group, an isopropyl group, a butyl group, a pentyl group, a hexyl group, a heptyl group, and an octyl group. From the perspective of ensuring sufficient transparency of the molded article, the total number of carbons in the alkyl groups of $R^1$ to $R^4$ is preferably from 6 to 30, more preferably from 6 to 24, and particularly preferably from 8 to 20.

In formula (3), $R^5$ is an alkyl group, a fluoroalkyl group, or a hydrogen atom. The alkyl group of $R^5$ is a short-chain alkyl group having from 1 to 10 carbons, such as a methyl group or an ethyl group. The fluoroalkyl group of $R^5$ is a short-chain fluoroalkyl group having from 1 to 10 carbons, such as $CF_3$ or $C_2F_5$. Of these, $R^5$ is preferably hydrogen.

Specific examples of these include salts formed of alkyl quaternary ammonium cations such as $(C_2H_5)_4N^+$, $(C_3H_7)_4N^+$, $(C_4H_9)_4N^+$, and $(C_5H_{11})_4N^+$, and anions such as $CF_3SO_4-$, $CH_3SO_4-$, and $HSO_4-$. These compounds may each be used alone or may be used in combinations of two or more types. Among these, from the perspective of ensuring sufficient transparency of the molded article, a hydrogen sulfate of an alkyl quaternary ammonium is preferable, tetraethylammonium hydrogensulfate [$(C_2H_5)_4$NHSO$_4$], tetrapropylammonium hydrogensulfate [$(C_3H_7)_4$NHSO$_4$], tetrabutylammonium hydrogensulfate [$(C_4H_9)_4$NHSO$_4$], tetrapentylammonium hydrogensulfate [$(C_5H_{11})_4$NHSO$_4$], and tetrahexylammonium hydrogensulfate [$(C_6H_{13})_4$NHSO$_4$] are more preferable, at least one selected from tetraethylammonium hydrogensulfate, tetrapropylammonium hydrogensulfate, and tetrabutylammonium hydrogensulfate is particularly preferable, and tetrabutylammonium hydrogensulfate is most preferable.

From the perspective of suppressing yellowing, the content of the alkyl quaternary ammonium sulfate is preferably not greater than 10 parts by weight, more preferably not greater than 5 parts by weight, and even more preferably not greater than 1.3 parts by weight, per 100 parts by weight of the vinylidene fluoride polymer. Furthermore, from the perspective of maintaining transparency, the content is preferably at least 0.3 parts by weight, more preferably at least 0.7 parts by weight, and even more preferably at least 0.8 parts by weight, per 100 parts by weight of the vinylidene fluoride polymer.

(Other Components)

The resin composition according to the present embodiment may further contain other components in a range in which the effects of the present embodiment can be obtained. One type of the other component may be used, or two or more types may be used. The content of additives in the resin composition can be appropriately determined within a range in which both the effects of the present embodiment and the effects of the additives are obtained. Examples of other components described above include additives and polymers besides the vinylidene fluoride polymer. Examples of additives include thermal stabilizers, UV absorbers, lubricants, plasticizers, bluing agents, and anticoloration agents.

<Method of Producing Resin Composition>

The method of producing a resin composition according to the present embodiment is not particularly limited, and for example, a resin composition can be obtained by mixing a powder or pellets of a vinylidene fluoride polymer and an alkyl quaternary ammonium sulfate.

Examples of the device for mixing the materials of the resin composition include a Henschel blender, a cylindrical mixer, a screw-type mixer, a screw-type extruder, a turbulizer, a Nauta mixer, a V-type mixer, a ribbon mixer, a double arm kneader, a flow-type mixer, an air flow-type mixer, a rotary disk-type mixer, a roll mixer, a rolling mixer, and a Loedige mixer.

In addition, a pellet-formed resin composition can be obtained by drying a mixture of a vinylidene fluoride polymer and an alkyl quaternary ammonium sulfate and melt-extruding the obtained dried product. Examples of the extruder include a single screw extruder, a co-rotating twin screw extruder, and a counter-rotating twin screw extruder.

As the vinylidene fluoride polymer and the alkyl quaternary ammonium sulfate, the vinylidene fluoride polymer and alkyl quaternary ammonium sulfate described above may be used. Additionally, the addition amount of the alkyl quaternary ammonium sulfate may be adjusted such that the content in the resin composition is within the range described above.

<Molded Article>

The molded article according to the present embodiment has a thickness of 1 mm or greater and is molded from the resin composition of the present embodiment. The shape of the molded article can be appropriately determined within a range in which the molding described below is feasible. A molded article having a thickness of 1 mm or greater refers to a molded article having a thickness of 1 mm or greater at the thinnest portion. Also, the term thickness is intended to mean an average value of any multiple (e.g., five) thickness measurements. A YI value of 40 or less, measured using spectrophotometric colorimetry, and a haze of 40% or less can be realized even in a molded article having a thickness of 1 mm or greater by using the resin composition according to the present embodiment. Furthermore, such YI value and haze can be realized even in a molded article having a thickness of 2 mm or greater, and such YI value and haze value can even be realized in a molded article having a thickness of 3 mm or greater. That is, the thickness of the molded article according to the present embodiment may be 1 mm or greater, 2 mm or greater, or even 3 mm or greater.

In addition, as described above, even if the thickness of the molded article of the present embodiment is 1 mm or greater, the YI value measured using spectrophotometric colorimetry may be 40 or less, may be 30 or less, and may be 20 or less. Note that the YI value in the present specification is an average value obtained by placing a white board on the molded article, measuring, through a reflection measurement method, any four locations of the molded article using a colorimetry color difference meter (for example, Color Meter ZE 6000 (available from Nippon Denshoku Industries Co., Ltd.)), and calculating the average value in accordance with ASTM D1925.

The haze of the molded article of the present embodiment is not greater than 40%. The haze of the molded article can be measured by a known method using a commercially available haze meter. In addition, an average value of measurements taken at any four locations is used as the haze of the molded article.

(Method of Producing a Molded Article)

A molded article of the present embodiment can be produced by a known method such as injection molding or press molding, calendar molding, extrusion molding, and melt spinning, in the same manner as the production of a conventional molded product of a vinylidene fluoride polymer. Furthermore, the production method thereof can be selected in accordance with the desired shape of the molded article.

The form of the resin composition to be supplied for molding the molded article is only required to be applicable to the molding method. Such a form may be, for example, a powder, but may also be pellets, flakes, a compression molded product of the powder, or a molded product to be accommodated in a mold. In the production of the molded article, the resin composition is heated to a temperature at which the resin composition melts sufficiently, and is melted and molded.

(Injection Molding)

Injection molding is a method of obtaining a molded article by, for example, supplying a resin composition to an injection molding machine, melting the resin composition by heating, pouring the molten resin composition into a mold, and then injecting, and cooling.

(Press Molding)

Press molding is generally a method of obtaining a molded article by filling a mold with a resin composition, hot pressing the resin composition at a high temperature using a compression molding machine (e.g., 3 minutes at 230° C. and a pressure of 5 MPa), and then cold pressing (e.g., 3 minutes at 30° C.).

The mold used in press molding is only required to be a member that can be used for heating and pressurization and can maintain the molten resin composition in a shape to be molded. Examples of such molds include metal molds and metal sheets such as aluminum foil.

In a case in which the shape of the molded article in the present embodiment is a sheet-like shape, from the perspective of achieving a uniform thickness and a smooth surface of the molded article, the molten resin composition is preferably pressurized. That is, in press molding, the resin composition is preferably pressed by a press member and molded into a sheet-like shape while the resin composition is melted by heating the press member. The press member is only required to be a known member capable of implementing the aforementioned heating and pressurization.

The pressure at which cold pressing is implemented may be the same as or different from the pressure when hot pressing. The temperature and time of the cold pressing may be determined as appropriate. For example, the temperature may be from 5° C. to 40° C., and the time may be from 2 minutes to 10 minutes.

(Other Steps)

The method of producing a molded article may further include other steps within a range in which the effect of the present embodiment can be obtained. Examples of such other steps include a preheating step in which the mold is preheated prior to molding, a molded article fabrication step in which a molded product of the resin composition is fabricated in a mold, a gradual cooling step in which the molded article after heating and press molding is gradually cooled, and an annealing step in which the obtained molded article is annealed.

(Shape of the Molded Article)

The shape of the molded article obtained by the production method described above is not particularly limited and may be various shapes. Examples of the shape of the obtained molded article include injection molded bodies, pipe shapes, round bars, square bars, sheet shapes, film shapes, and fiber shapes.

SUMMARY

As described above, the resin composition according to an embodiment of the present invention contains a vinylidene fluoride polymer as a main component, and further contains an alkyl quaternary ammonium sulfate, and a percentage of irregular sequences in the vinylidene fluoride polymer is 4% or greater.

In addition, in one aspect of the resin composition according to an embodiment of the present invention, in the infrared absorption spectrum, the absorbance ratio ($A_R$) expressed by the following equation is not greater than 0.09.

$$A_R = A_{1700\text{-}1800} / A_{3023}$$

In the above equation, $A_{1700\text{-}1800}$ is the absorbance at 1700 to 1800 cm$^{-1}$, and $A_{3023}$ is the absorbance at 3023 cm$^{-1}$.

In addition, in one aspect of the resin composition according to an embodiment of the present invention, the content of the alkyl quaternary ammonium sulfate is from 0.3 parts by weight to 10.0 parts by weight per 100 parts by weight of the vinylidene fluoride polymer.

Furthermore, in one aspect of the resin composition according to an embodiment of the present invention, the alkyl quaternary ammonium sulfate is an alkyl quaternary ammonium hydrogensulfate.

In addition, in one aspect of the resin composition according to an embodiment of the present invention, the alkyl quaternary ammonium sulfate is at least one selected from tetraethylammonium hydrogensulfate, tetrapropylammonium hydrogensulfate, and tetrabutylammonium hydrogensulfate.

Furthermore, in one aspect of the resin composition according to an embodiment of the present invention, the vinylidene fluoride polymer is a homopolymer of vinylidene fluoride or a copolymer of vinylidene fluoride and hexafluoropropylene.

In addition, a molded article according to an embodiment of the present invention is a molded article of a resin composition containing a vinylidene fluoride polymer as a main component, the molded article is formed from the above-described resin composition, and the molded article has a haze of not greater than 40%, a YI value of not greater than 40, and a thickness of 1 mm or greater.

Furthermore, a method of producing a resin composition according to an embodiment of the present invention is a method of producing a resin composition that contains a vinylidene fluoride polymer as a main component, the method including adding an alkyl quaternary ammonium sulfate to a vinylidene fluoride polymer having a percentage of irregular sequences of 4% or greater.

Furthermore, a method of producing a molded article according to an embodiment of the present invention is a method of producing a molded article of a resin composition containing a vinylidene fluoride polymer as a main component, the method including molding the resin composition at 190° C. or higher. The resin composition described above is used as the resin composition.

In addition, in one aspect of the method of producing a molded article according to an embodiment of the present invention, a molded article having a thickness of 1 mm or greater is obtained in the molding.

Another aspect of a molded article according to an embodiment of the present invention is a molded article of a resin composition containing a vinylidene fluoride polymer as a main component, the molded article having a haze of not greater than 40%, a YI value of not greater than 40, and a thickness of 1 mm or greater.

Examples are presented below to describe embodiments of the present invention in further detail. The present invention is of course not limited to the examples below, and it goes without saying that various aspects are possible for the details. Furthermore, the present invention is not limited to the embodiments described above, and various modifications are possible within the scope indicated in the claims. Embodiments obtained by appropriately combining the technical means disclosed by the embodiments are also included in the technical scope of the present invention. In addition, all documents described in the present specification are incorporated by reference.

EXAMPLES

[Resin Composition Production]
(Resin Composition 1)

Tetrabutylammonium hydrogensulfate (available from Koei Chemical Co., Ltd., hereinafter abbreviated as "TBAHS") was added to 100 parts by weight of a vinylidene fluoride polymer such that the amount of TBAHS was 1.0 parts by weight. Kynar (trade name) 740 (vinylidene fluoride homopolymer) available from Arkema S.A. was used as the vinylidene fluoride polymer. Next, the material was extruded using a co-rotating twin screw extruder (TEM-26, available from Toshiba Machine Co., Ltd.) at a cylinder temperature of 190° C., and a pellet-formed resin composition 1 was obtained.

(Resin Composition 2)

A resin composition 2 was obtained in the same manner as in the production of the resin composition 1 with the exception that the vinylidene fluoride polymer was changed to Kynar (trade name) 1000HD (vinylidene fluoride homopolymer) available from Arkema S.A.

(Resin Composition 3)

A resin composition 3 was obtained in the same manner as in the production of the resin composition 1 with the exception that the vinylidene fluoride polymer was changed to FR907 (vinylidene fluoride homopolymer) available from The 3M Company.

(Resin Composition 4)

A resin composition 4 was obtained in the same manner as in the production of the resin composition 1 with the exception that the vinylidene fluoride polymer was changed to Kynar (trade name) 2800-00 (vinylidene fluoride-hexafluoropropylene copolymer) available from Arkema S.A.

(Resin Composition 5)

A resin composition 5 was obtained in the same manner as in the production of the resin composition 1 with the exception that the vinylidene fluoride polymer was changed to Solef 6010/0001 (vinylidene fluoride homopolymer) available from Solvay S.A.

(Resin Composition 6)

A resin composition 6 was obtained in the same manner as in the production of the resin composition 1 with the exception that the vinylidene fluoride polymer was changed to a vinylidene fluoride homopolymer (Polymer A) produced as described below. The vinylidene fluoride polymer in the resin composition 6 was produced under the same conditions as the production conditions of the polymer described in Example 4 in the patent document WO 2006/061988.
(Resin Composition 7)

A resin composition 7 was obtained in the same manner as in the production of the resin composition 1 with the exception that the amount of TBAHS was changed to 0.7 parts by weight.
(Resin Composition 8)

A resin composition 8 was obtained in the same manner as in the production of the resin composition 1 with the exception that the amount of TBAHS was changed to 3.0 parts by weight.
(Resin Composition 9)

A resin composition 9 was obtained in the same manner as in the production of resin composition 1 with the exception that the amount of TBAHS was changed to 5.0 parts by weight.
(Resin Composition 10)

A resin composition 10 was obtained in the same manner as in the production of the resin composition 1 with the exception that tetraethylammonium hydrogensulfate (available from Tokyo Chemical Industry Co., Ltd., hereinafter abbreviated as "TEAHS") was used instead of TBAHS.
(Resin Composition 11)

A resin composition 11 was obtained in the same manner as in the production of the resin composition 1 with the exception that tetrapropylammonium hydrogensulfate (available from Aldrich, hereinafter abbreviated as "TPAHS") was used instead of TBAHS.
(Resin Composition 12)

A resin composition 12 was obtained in the same manner as in the production of the resin composition 1 with the exception that the vinylidene fluoride polymer was changed to Solef 11010/0001 (vinylidene fluoride-hexafluoropropylene copolymer) available from Solvay S.A.
(Resin Composition 13)

A resin composition 13 was obtained in the same manner as in the production of the resin composition 1 with the exception that the vinylidene fluoride polymer was changed to KF #1000 (vinylidene fluoride homopolymer) available from Kureha Corporation.
(Resin Composition 14)

A resin composition 14 was obtained in the same manner as in the production of the resin composition 1 with the exception that the vinylidene fluoride polymer was changed to KF #2300 (vinylidene fluoride-hexafluoropropylene copolymer) available from Kureha Corporation.
[Evaluation of Vinylidene Fluoride Polymer]

The percentage of irregular sequences, the absorbance ratio ($A_R$), the inherent viscosity, and the melting point of each vinylidene fluoride polymer were determined as follows. The results are shown in Table 1.
(Percentage of Irregular Sequences)

An amount of 40 mg of vinylidene fluoride polymer was dissolved in 0.8 ml of deuterated dimethylformamide (D7-DMF) and $^{19}$F-NMR measurements were implemented at room temperature. The percentage of irregular sequences was calculated from the following equation with the total of the surface areas of the five main peaks at positions of −91.6 ppm, −92.1 ppm, −94.7 ppm, −113.5 ppm, and −115.9 ppm in the obtained $^{19}$F-NMR spectra being denoted by S0, the surface area of the peak at −113.5 ppm being denoted by S1, and the surface area of the peak at −115.9 ppm being denoted by S2.

Irregular Sequence Percentage (%)=[{(S1+S2)/2}/S0]×100

(Absorbance Ratio ($A_R$))

The vinylidene fluoride polymer was hot-pressed at 230° C. to fabricate a pressed sheet with a thickness of from 50 μm to 100 μm. The IR spectra of the fabricated pressed sheet was measured in a range of from 1500 cm$^{-1}$ to 4000 cm$^{-1}$ by using the infrared spectrophotometer FT/IR-4100 (available from JASCO Corporation). The absorbance ratio ($A_R$) was determined by the following equation.

$$A_R = A_{1700-1800}/A_{3023}$$

In the above equation, $A_{1700-1800}$ is the absorbance originating from the stretching vibration of carbonyl groups detected in a range of from 1700 to 1800 cm$^{-1}$, and $A_{3023}$ is the absorbance originating from the stretching vibration of CH detected near 3023 cm$^{-1}$. Specifically, when a line connecting the absorbance at 1660 cm$^{-1}$ and the absorbance at 1900 cm$^{-1}$ was defined as a baseline, the maximum absorbance in a range of from 1700 cm$^{-1}$ to 1800 cm$^{-1}$ was denoted by $A_{1700-1800}$. Meanwhile, when a line connecting the absorbance at 2900 cm$^{-1}$ and the absorbance at 3300 cm$^{-1}$ was defined as a baseline, the maximum absorbance at 3023±10 cm$^{-1}$ was denoted by $A_{3023}$.
(Melting Point)

A measurement sample was produced by cutting out a very small piece from the molded article. The sample was subjected to measurements using a differential scanning calorimeter "DSC-1" (available from Mettler-Toledo International Inc.) while the temperature was raised from 30° C. to 230° C. at a rate of 10° C./minute. The melting point of the molded article was determined from the temperature of the peak top in the crystal melting peak observed in the temperature raising process.
(Inherent Viscosity)

The inherent viscosity ηi was determined from the following equation by dissolving 80 mg of the vinylidene fluoride polymer in 20 mL of N,N-dimethylformamide, and using an Ubbelohde viscometer in a 30° C. thermostatic bath.

$$\eta i = (1/C)\cdot\ln(\eta/\eta o)$$

Here, η is the viscosity of the polymer solution, ηo is the viscosity of the N,N-dimethylformamide alone, and C is 0.4 (g/dl).

TABLE 1

| Resin Composition | Polymer | Polymerization Method | Inherent Viscosity (dL/g) | Melting Point (° C.) | HFP Amount (wt. %) | Absorbance Ratio ($A_R$) | Irregular Sequence (%) | Ammonium Salt | Content (parts by weight) |
|---|---|---|---|---|---|---|---|---|---|
| 1 | Kynar 740 | Emulsification | 1.0 | 167 | 0 | 0.048 | 4.8 | TBAHS | 1.0 |
| 2 | Kynar 1000HD | Emulsification | 1.1 | 166 | 0 | 0.073 | 4.8 | TBAHS | 1.0 |
| 3 | FR907 | Emulsification | 1.0 | 168 | 0 | 0.074 | 4.4 | TBAHS | 1.0 |

TABLE 1-continued

| Resin Com-position | Polymer | Poly-merization Method | Inherent Viscosity (dL/g) | Melting Point (° C.) | HFP Amount (wt. %) | Absorbance Ratio ($A_R$) | Irregular Sequence (%) | Ammonium Salt | Ammonium Salt Content (parts by weight) |
|---|---|---|---|---|---|---|---|---|---|
| 4 | Kynar 2800-00 | Emulsification | 1.05 | 139 | 11 | 0.068 | 4.3 | TBAHS | 1.0 |
| 5 | Solef 6010/0001 | Suspension | 1.05 | 170 | 0 | 0.104 | 4.4 | TBAHS | 1.0 |
| 6 | Polymer A | Suspension | 1.1 | 171 | 0 | 0.100 | 4.1 | TBAHS | 1.0 |
| 7 | Kynar 740 | Emulsification | 1.0 | 167 | 0 | 0.048 | 4.8 | TBAHS | 0.7 |
| 8 | Kynar 740 | Emulsification | 1.0 | 167 | 0 | 0.048 | 4.8 | TBAHS | 3.0 |
| 9 | Kynar 740 | Emulsification | 1.0 | 167 | 0 | 0.048 | 4.8 | TBAHS | 5.0 |
| 10 | Kynar 740 | Emulsification | 1.0 | 167 | 0 | 0.048 | 4.8 | TEAHS | 1.0 |
| 11 | Kynar 740 | Emulsification | 1.0 | 167 | 0 | 0.048 | 4.8 | TPAHS | 1.0 |
| 12 | Solef 11010/0001 | Suspension | 1.0 | 160 | 9 | 0.134 | 3.8 | TBAHS | 1.0 |
| 13 | KF#1000 | Suspension | 1.0 | 173 | 0 | 0.104 | 3.8 | TBAHS | 1.0 |
| 14 | KF#2300 | Suspension | 0.95 | 152 | 10 | 0.132 | 3.6 | TBAHS | 1.0 |

[Molded Article Production and Evaluation 1]

(Molded Article Production)

The obtained resin composition was sandwiched between aluminum foils, and then further sandwiched between stainless steel (SUS) plates, and pressed at 200° C. for 5 minutes under a pressure of 5 MPa using a compression molding machine (Model AYSR-5, available from Shinto Metal Industries, Ltd.). Next, the pressed article was immediately cooled (quenched) with a cold press at 30° C. for 3 minutes while the pressed article remained sandwiched between the SUS plates. A sheet-like molded article was thus produced. The thickness of the molded article was measured five times for each sample using a thickness gauge "DG-925" (available from Ono Sokki Co., Ltd.), and the average value was determined. This average value was used as the thickness of the molded article.

(Molded Article Evaluation)

The YI value of each molded article was calculated in accordance with ASTM D1925 by placing a white board on the molded article, and performing measurements, through a reflection measurement method, using the Color Meter ZE 6000 colorimetry color difference meter (available from Nippon Denshoku Industries Co., Ltd.). Four arbitrary locations on the molded article were measured, and the average value thereof was used as the YI value of the molded article.

The haze of each molded articles was measured using a haze meter "NDH4000" (available from Nippon Denshoku Industries Co., Ltd.) in accordance with JIS K7136. The results are shown in Table 2.

TABLE 2

| | Molded Article | | |
|---|---|---|---|
| Resin Composition | Haze % | YI value | Thickness mm |
| 1 | 33.1 | 16.3 | 2 |
| 2 | 29.6 | 17.2 | 2 |
| 3 | 16.2 | 23.6 | 2 |
| 4 | 28.3 | 22.0 | 2 |
| 5 | 19.9 | 24.5 | 2 |
| 6 | 16.3 | 17.9 | 2 |
| 7 | 38.3 | 16.7 | 2 |
| 8 | 22.4 | 16.3 | 2 |
| 9 | 21.2 | 16.2 | 2 |
| 10 | 27.6 | 16.2 | 2 |
| 11 | 23.6 | 15.6 | 2 |
| 12 | 61.6 | 71.6 | 2 |
| 13 | 25.5 | 45.8 | 2 |
| 14 | 29.5 | 42.1 | 2 |

As shown in Tables 1 and 2, the molded articles obtained using the resin compositions 1 to 11 containing a vinylidene fluoride polymer having a percentage of irregular sequences of 4% or greater had a low YI value even when the thickness was 2 mm.

[Molded Article Production and Evaluation 2]

Molded articles were produced and evaluated in the same manner as in [Molded article production and evaluation 1] with the exception that the conditions for hot pressing were changed to (A) 230° C., 2 minutes, and 5 MPa, or (B) 260° C., 2 minutes, and 5 MPa. Note that the resin compositions 1 and 6 were used as the resin compositions. The results are shown in Table 3.

TABLE 3

| Resin Composition | Pressing Conditions* | Haze % | YI value | Thickness mm |
|---|---|---|---|---|
| 1 | A | 25.9 | 17.9 | 2 |
| 1 | B | 28.3 | 30.7 | 2 |
| 6 | A | 15.2 | 21.5 | 2 |
| 6 | B | 15.3 | 45.9 | 2 |

*Pressing conditions:
A 230° C., 2 min, 5 MPa
B 260° C., 2 min, 5 MPa

As shown in Tables 1 and 3, the molded article obtained using the resin composition 1 containing a vinylidene fluoride polymer having an absorbance ratio ($A_R$) of 0.09 or less had a low YI value (40 or lower) even when the pressing temperature was a higher temperature (260° C.).

INDUSTRIAL APPLICABILITY

The present invention can be used in highly transparent members such as optical members.

The invention claimed is:

1. A resin composition comprising a vinylidene fluoride polymer as a main component,
the resin composition further comprising an alkyl quaternary ammonium sulfate,
a percentage of irregular sequences in the vinylidene fluoride polymer being 4.3% or greater, and
the vinylidene fluoride polymer having, in an infrared absorption spectrum, an absorbance ratio ($A_R$) of not greater than 0.09, the absorbance ratio ($A_R$) being expressed by the following equation:

$$A_R = A_{1700-1800}/A_{3023},$$

wherein $A_{1700-1800}$ is the absorbance at 1700 to 1800 cm$^{-1}$, and $A_{3023}$ is the absorbance at 3023 cm$^{-1}$.

2. The resin composition according to claim 1, wherein a content of the alkyl quaternary ammonium sulfate is from 0.3 parts by weight to 10.0 parts by weight per 100 parts by weight of the vinylidene fluoride polymer.

3. The resin composition according to claim 1, wherein the alkyl quaternary ammonium sulfate is an alkyl quaternary ammonium hydrogensulfate.

4. The resin composition according to claim 1, wherein the alkyl quaternary ammonium sulfate is at least one selected from tetraethylammonium hydrogensulfate, tetrapropylammonium hydrogensulfate, and tetrabutylammonium hydrogensulfate.

5. The resin composition according to claim 1, wherein the vinylidene fluoride polymer is a homopolymer of vinylidene fluoride or a copolymer of vinylidene fluoride and hexafluoropropylene.

6. A molded article of a resin composition comprising a vinylidene fluoride polymer as a main component,
the molded article being formed from the resin composition described in claim 1, and
the molded article having a haze of not greater than 40%, a yellowness index (YI) value of not greater than 40, and a thickness of 1 mm or greater.

7. A method of producing a resin composition comprising a vinylidene fluoride polymer as a main component, the method comprising:
adding an alkyl quaternary ammonium sulfate to a vinylidene fluoride polymer having a percentage of irregular sequences of 4.3% or greater,
wherein the vinylidene fluoride polymer has, in an infrared absorption spectrum, an absorbance ratio ($A_R$) of not greater than 0.09, the absorbance ratio ($A_R$) being expressed by the following equation:

$$A_R = A_{1700-1800}/A_{3023}$$

wherein $A_{1700-1800}$ is the absorbance at 1700 to 1800 cm$^{-1}$, and $A_{3023}$ is the absorbance at 3023 cm$^{-1}$.

8. A method of producing a molded article of a resin composition comprising a vinylidene fluoride polymer as a main component, the method comprising:
molding the resin composition at a temperature of at least 190° C.,
wherein, the resin composition described in claim 1 is used as the resin composition.

9. The method of producing a molded article according to claim 8, wherein a molded article having a thickness of 1 mm or greater is obtained in the molding.

10. A molded article of a resin composition comprising a vinylidene fluoride polymer as a main component,
the molded article having a haze of not greater than 40%, a YI value of not greater than 40, and a thickness of 1 mm or greater.

* * * * *